R. W. MAUDSLAY.
LUBRICATION OF LAMINATED SPRINGS.
APPLICATION FILED JUNE 18, 1917.
1,272,290.
Patented July 9, 1918.
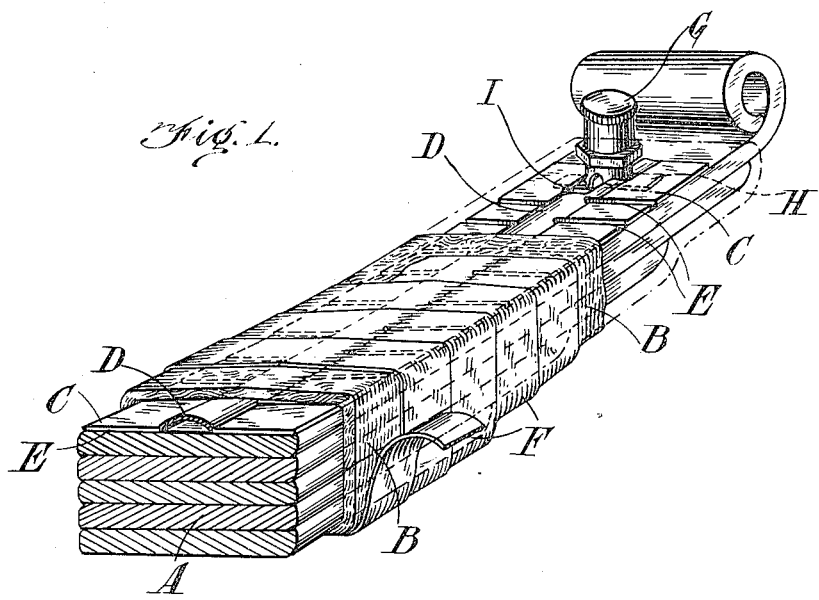
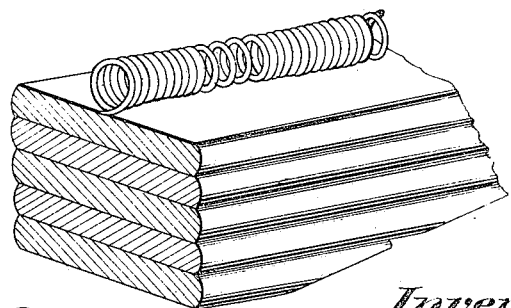
Inventor:
Reginald Walter Maudslay,
by Spear, Middleton, Donaldson & Spear
Attys.

UNITED STATES PATENT OFFICE.

REGINALD WALTER MAUDSLAY, OF COVENTRY, ENGLAND.

LUBRICATION OF LAMINATED SPRINGS.

1,272,290.      Specification of Letters Patent.      Patented July 9, 1918.

Application filed June 18, 1917. Serial No. 175,516.

*To all whom it may concern:*

Be it known that I, REGINALD WALTER MAUDSLAY, a subject of the King of England, residing in Coventry, Warwickshire, England, have invented certain new and useful Improvements in the Lubrication of Laminated Springs, of which the following is a specification.

This invention relates to apparatus for lubricating laminated springs such as are used on road vehicles and comprises the combination with a spring, of a flexible lubricating duct (or ducts) and absorbent material which extends from the discharge opening or openings of the duct to the parts of the spring where the lubricant is to be applied. A wrapping can be provided to bind the duct and absorbent material on to the spring, and if desired the duct can be embedded in the absorbent material.

In the accompanying drawing Figure 1 a laminated spring for vehicles is shown in perspective and partly in section, provided with a lubricating device according to this invention. Fig. 2 is a modification.

An oil distributing metal plate C provided with a channel D and oil discharging slits E, is bound on to a laminated spring A by absorbent felt B and by a tape F, which latter also forms an oil-tight wrapping. The slits E open into the channel D so that the oil can escape laterally from the channel, and at the same time the slits increase the resiliency of the plate C. An oil cup G is formed with feet H which can be inserted in a slit I, and then the cup can be turned through 90° into the position shown, after which the canvas tape can be wrapped on.

The duct can consist of a closely wound helical spring as shown in Fig. 2 instead of a channeled plate and the said spring can be any length desired and can be opened out where it is required to deliver the oil. The invention is particularly applicable to use with oil (as distinct from grease) because the absorbent material prevents the oil running to waste. This system can be in many cases combined with the applicant's system of shackle pin lubrication described in British Specification No. 102,549, the lubricant passing first to the shackle pins and thence to the flexible duct when it is connected to the system on the shackle pin. In practice a wrapping as shown on the drawing is used and over this a cover or garter of non-absorbent material which may be either permanently stitched up or fixed with eyelets and laces.

What I claim as my invention and desire to secure by Letters Patent is:—

1. In spring lubricating apparatus, the combination with a laminated plate vehicle spring, of a flexible lubricating duct having discharging openings extending along said spring, and absorbent material extending from the openings to the parts of the spring to be lubricated.

2. In spring lubricating apparatus, the combination with a laminated plate vehicle spring, of a flexible lubricating duct having discharging openings extending along said spring, absorbent material extending from the openings to the parts of the spring to be lubricated, and a wrapping to cover the duct and absorbent material.

3. In spring lubricating apparatus, the combination with a laminated plate vehicle spring, of a wrapping of absorbent material on said spring, and a flexible lubricating duct in said wrapping, said duct having oil discharging openings.

4. In spring lubricating apparatus the combination with a laminated plate vehicle spring, of a pad of absorbent material, a channeled oil distributing plate between the spring and the pad, a wrapping to bind the plate and pad to the spring, and means operatively connected to the plate to feed oil thereto.

5. In spring lubricating apparatus, the combination with a laminated plate vehicle spring, of a pad of absorbent material, an oil distributing plate located between the spring and the pad and formed with a lengthwise channel and transverse oil discharging slits, a wrapping to bind the plate and pad to the spring, and means operatively connected to the plate to feed oil thereto, for the purpose set forth.

In testimony whereof I have signed my name to this specification in the presence of two subscribing witnesses.

REGINALD WALTER MAUDSLAY.

Witnesses:
    CYRIL CUTHBERT,
    FREDERICK ARTHUR LUCAS.